(12) United States Patent
LaBelle et al.

(10) Patent No.: US 10,479,517 B2
(45) Date of Patent: Nov. 19, 2019

(54) COMPOSITE FAN COWL WITH A CORE HAVING TAILORED THICKNESS

(71) Applicant: The Boeing Company, Chicago, IL (US)

(72) Inventors: Joseph Benjamin LaBelle, Mount Pleasant, SC (US); Jason Franklin Joel, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 357 days.

(21) Appl. No.: 15/369,195

(22) Filed: Dec. 5, 2016

(65) Prior Publication Data

US 2018/0155042 A1 Jun. 7, 2018

(51) Int. Cl.
*B64D 29/06* (2006.01)
*B64D 29/08* (2006.01)
*F01D 25/28* (2006.01)
*B64C 1/00* (2006.01)

(52) U.S. Cl.
CPC ............ *B64D 29/08* (2013.01); *F01D 25/28* (2013.01); *B64C 2001/0072* (2013.01); *B64D 29/06* (2013.01); *F05D 2240/14* (2013.01)

(58) Field of Classification Search
CPC .......... B64D 29/08; B64D 29/06; B64C 1/14; B64C 2001/0072; F01D 25/265; F01D 25/28; F05D 2240/14
See application file for complete search history.

(56) References Cited

U.S. PATENT DOCUMENTS 6,375,121 B1 * 4/2002 Porte ...................... B29C 70/30
244/129.4

FOREIGN PATENT DOCUMENTS

| EP | 3000734 A1 | 3/2016 |
|----|------------|--------|
| WO | WO0158680 A1 | 8/2001 |

OTHER PUBLICATIONS

Extended European Search Report, dated Jul. 16, 2018, regarding Application No. EP17194463.0, 8 pages.

* cited by examiner

*Primary Examiner* — Jacob M Amick
(74) *Attorney, Agent, or Firm* — Yee & Associates, P.C.

(57) ABSTRACT

An engine nacelle comprised of a top portion with hinges and a composite fan cowl pivotally connected to the top portion by the hinges. The composite fan cowl comprises a core with a hinge zone having a first thickness and a body zone having a second thickness. The hinge zone includes the hinges. The body zone is distal from the hinge zone, and the first thickness is less than the second thickness.

21 Claims, 7 Drawing Sheets

COMPOSITE FAN COWL WITH A CORE HAVING TAILORED THICKNESS

BACKGROUND INFORMATION

1. Field

The present disclosure relates generally to composite fan cowls, and more specifically, to composite fan cowls with a reduced weight. Yet more specifically, the present disclosure includes a composite fan cowl with a core having tailored thickness.

2. Background

In vehicles, increased weight decreases fuel efficiency of the vehicles. In aircraft, additional weight of the vehicle replaces potential payload, such as customers, equipment, or other goods. Increased weight also increases the fuel costs of operating aircraft. Decreasing the weight of components used on the vehicles may be desirable to increase the payload for the vehicles or decrease fuel costs.

An engine nacelle is a housing connected to an aircraft covering an engine of the aircraft. Air enters through an inlet of the nacelle, travels through the nacelle and exits through the exhaust. Fan cowls form the body of the nacelle.

The fan cowls are associated with hinges and latches to facilitate movement of the fan cowls for maintenance. The latches secure the fan cowls in a closed position. When the latches are released, the fan cowls pivot relative to the rest of the nacelle using the hinges.

While a fan cowl is in an open position, it is subject to environmental forces. Gusts of wind striking an open fan cowl will apply a load to the fan cowl, causing the fan cowl to deform. It is desirable to control the deformation of the fan cowl due to wind gusts. Specifically, it is undesirable for the fan cowl to strike other components of the nacelle or other structures due to deformation. Further, it is undesirable for the fan cowl to permanently deform due to wind gusts.

It would be desirable to have a method and apparatus that takes into account at least some of the issues discussed above, including reducing aircraft weight while controlling fan cowl deformation, as well as other possible issues.

SUMMARY

In one illustrative embodiment, a composite fan cowl connected to hold open rods is provided. The composite fan cowl comprises hold open rods, laminate skins, and a core with areas of increased thickness associated with the hold open rods.

In another illustrative embodiment, a composite fan cowl is provided. The composite fan cowl comprises a core with a hinge zone having a first thickness, a body zone having a second thickness, and two areas of increased thickness including a third thickness, wherein the two areas of increased thickness are positioned within the body zone, wherein the first thickness and second thickness are different from each other, wherein the two areas of increased thickness have a greater thickness than the second thickness, and wherein the first thickness and second thickness are in the range of 0.5 inches and 1.5 inches.

In yet another illustrative embodiment, an engine nacelle is provided. The engine nacelle comprises a top portion with hinges, and a composite fan cowl pivotally connected to the top portion by the hinges. The composite fan cowl comprising a core with a hinge zone having a first thickness and a body zone having a second thickness, wherein the hinge zone includes the hinges, wherein the body zone is distal from the hinge zone, and wherein the first thickness is less than the second thickness.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The different illustrative embodiments recognize and take into account one or more different considerations. For example, the illustrative embodiments recognize and take into account that the weight of an aircraft may be reduced by reducing the weight of an engine nacelle. More specifically, the illustrative embodiments recognize and take into account that the weight of an engine nacelle may be reduced by reducing the weight of the composite fan cowls.

Additionally, the illustrative embodiments recognize and take into account that a composite fan cowl is a composite panel. The illustrative embodiments recognize and take into account that a composite panel may be considered a composite sandwich panel when the composite panel is comprised of a core layer of material that is sandwiched between a first layer of material and a second layer of material. The core layer of material may have a greater thickness than the first and second layers of material. The core layer of material may be hollow or have a gas contained within the core material. In some cases, the core layer of material may be comprised of a honeycomb material, a foam material, or some other suitable type of structure. A honeycomb material may be a material that has a honeycomb-like structure.

The illustrative embodiments also recognize and take into account that the core may be tailored to reduce the weight of the composite fan cowl. More specifically, the illustrative embodiments recognize and take into account that portions of the core may have a reduced thickness to reduce the weight of the composite fan cowl without undesirably increasing the deformation of the composite fan cowl. More specifically, the illustrative embodiments recognize and take into account that areas of higher thicknesses may provide stiffened areas of the core. Yet more specifically, the illustrative embodiments recognize and take into account that portions of the core having lower bending moments may have a reduced thickness.

Figure 1:
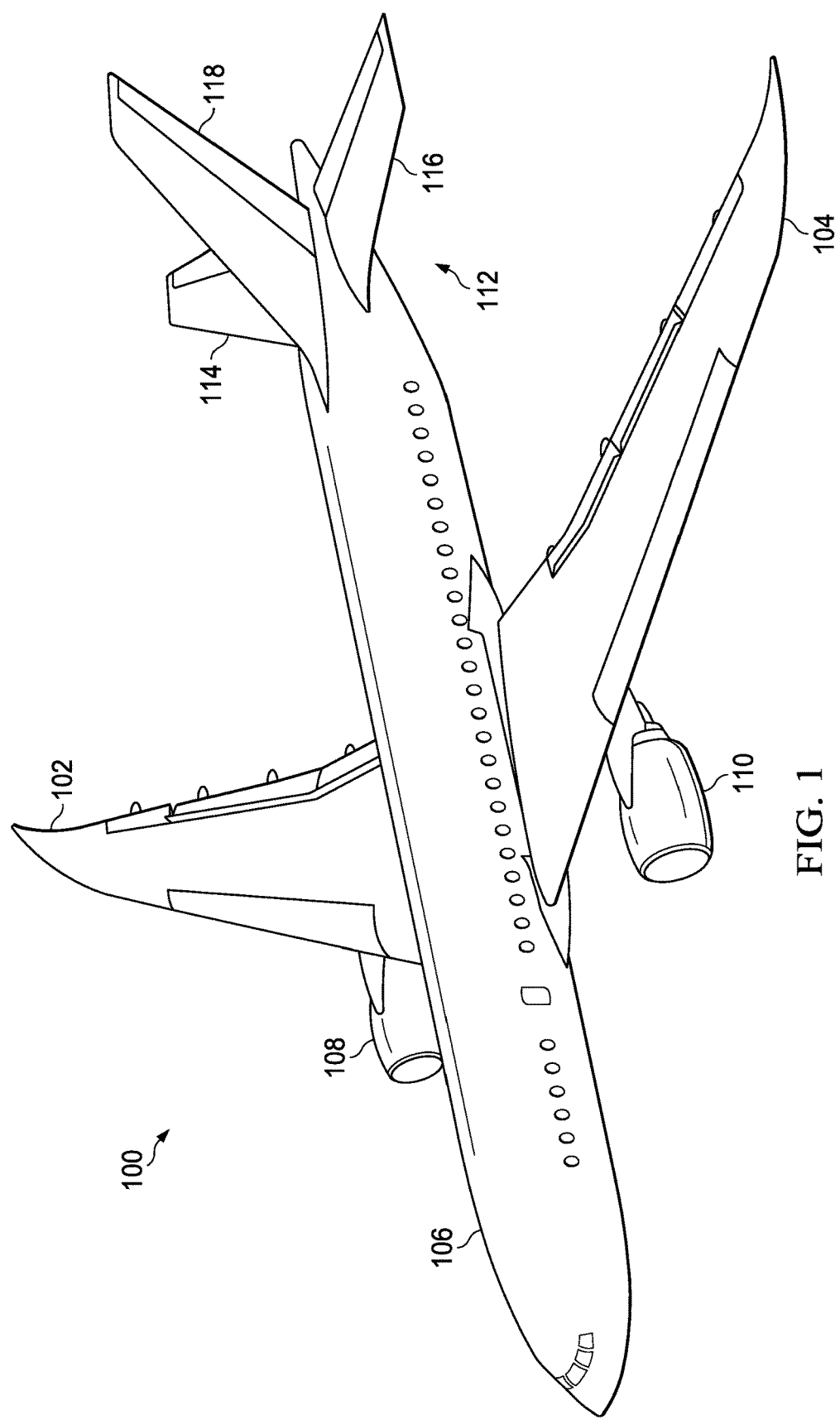
FIG. 1 is an illustration of an aircraft in which an illustrative embodiment may be implemented.

Referring now to the figures and, in particular, with reference to FIG. 1, an illustration of an aircraft is depicted in which an illustrative embodiment may be implemented. In this illustrative example, aircraft 100 has wing 102 and wing 104 connected to body 106. Aircraft 100 includes engine 108 connected to wing 102 and engine 110 connected to wing 104.

Body 106 has tail section 112. Horizontal stabilizer 114, horizontal stabilizer 116, and vertical stabilizer 118 are connected to tail section 112 of body 106.

Aircraft 100 is an example of an aircraft having a composite fan cowl with a core having a tailored thickness as described. For example, at least one of engine 108 or engine 110 may have a composite fan cowl with a core having varying thickness as described herein.

As used herein, the phrase "at least one of," when used with a list of items, means different combinations of one or more of the listed items may be used, and only one of each item in the list may be needed. In other words, "at least one of" means any combination of items or number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C or item B and item C. Of course, any combination of these items may be present. In other examples, "at least one of" may be, for example, without limitation, two of item A, one of item B, and ten of item C; four of item B and seven of item C; or other suitable combinations.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as a private passenger aircraft, a rotorcraft, or other suitable types of aircraft.

Figure 2:
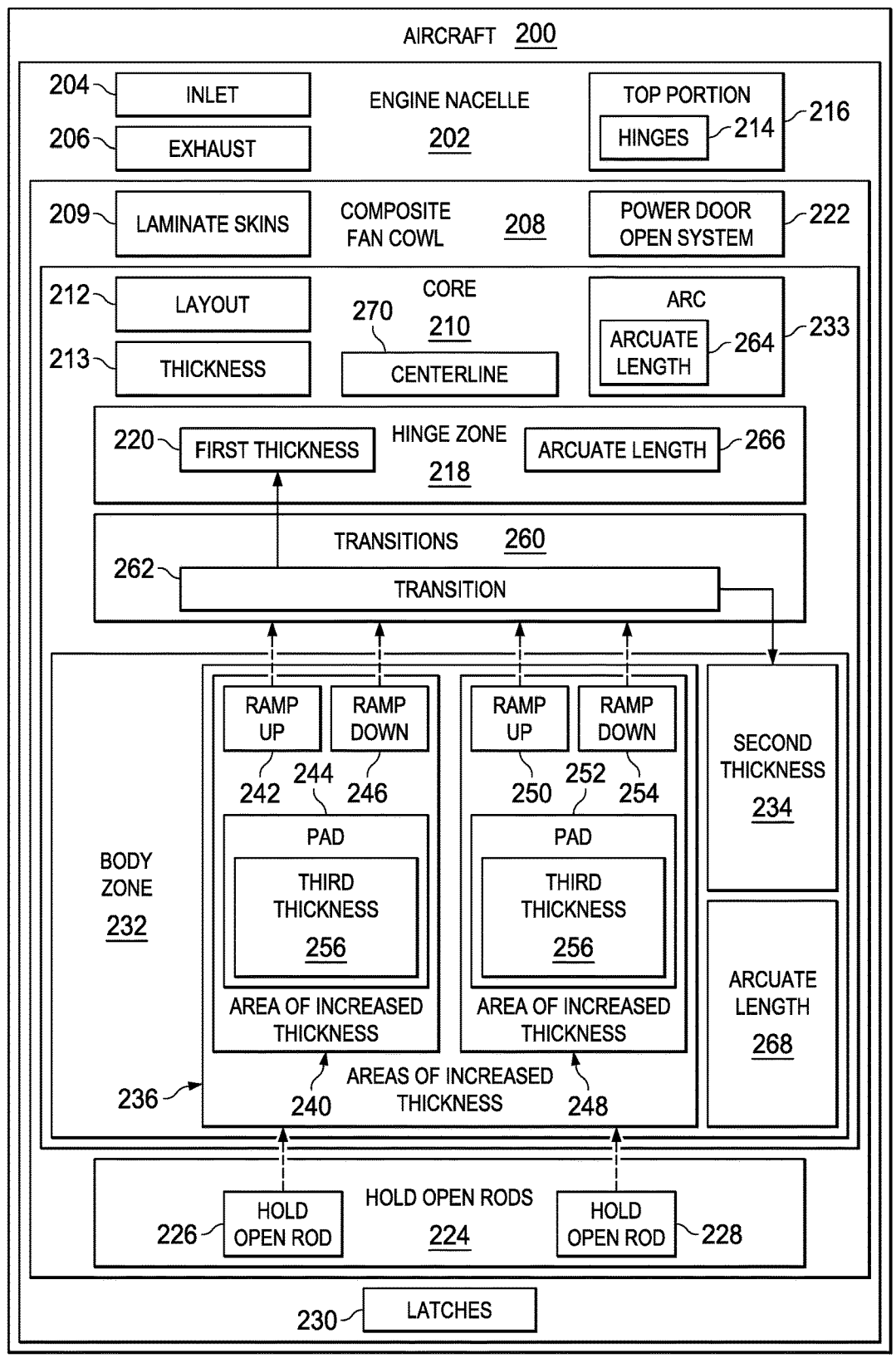
FIG. 2 is an illustration of a block diagram of an aircraft in accordance with an illustrative embodiment.

Turning now to FIG. 2, an illustration of a block diagram of an aircraft is depicted in accordance with an illustrative embodiment. Aircraft 100 of FIG. 1 may be a physical implementation of aircraft 200.

Aircraft 200 has engine nacelle 202. Engine nacelle 202 has inlet 204, exhaust 206, and composite fan cowl 208. Composite fan cowl 208 comprises laminate skins 209 and core 210. Laminate skins 209 are formed of any desirable material and have any desirable number of plies. A number of plies of each of laminate skins 209 is independent of the plurality of core thicknesses of core 210. A thickness of each of laminate skins 209 is independent of thicknesses of core 210.

Core 210 is formed of any desirable material. In some illustrative examples, core 210 is a honeycomb core. In other illustrative examples, core 210 may be formed of a foam. In yet other illustrative examples, core 210 may be formed of another lightweight, high strength material.

Core 210 has layout 212. Layout 212 is designed to reduce the weight of core 210 while maintaining performance of composite fan cowl 208. Layout 212 includes tailoring of thickness 213 of core 210. Layout 212 includes a quantity of, sizes of, and thicknesses for a plurality of zones of core 210.

Layout 212 is designed based on a bending moment of composite fan cowl 208 when subjected to wind gusts when composite fan cowl 208 is in an open position. Layout 212 is designed such that a measure of deformation of composite fan cowl 208 due to wind gusts is substantially the same as a measure of deformation of a conventional composite fan cowl. Layout 212 may be designed such that a measure of deformation of composite fan cowl 208 due to wind gusts is maintained or reduced.

Hinges 214 are in top portion 216 of engine nacelle 202. Composite fan cowl 208 is pivotally connected to top portion 216 with hinges 214. Composite fan cowl 208 pivots relative to the remainder of engine nacelle 202 using hinges 214.

Hinges 214 connect to composite fan cowl 208 in hinge zone 218. Hinge zone 218 has first thickness 220. First thickness 220 is selected based on performance characteristics for core 210. In some illustrative examples, first thickness 220 may be less than a thickness for a hinge zone of a conventional composite fan cowl. When first thickness 220 is less than a conventional hinge zone thickness, composite fan cowl 208 may be lighter than a conventional composite fan cowl.

Power door open system (PDOS) 222 is associated with composite fan cowl 208. Power door open system (PDOS) 222 actuates movement of composite fan cowl 208 relative to the remainder of engine nacelle 202. Power door open system (PDOS) 222 is associated with core 210 within hinge zone 218. First thickness 220 provides support and stiffness sufficient for the functioning of power door open system (PDOS) 222 of engine nacelle 202.

Composite fan cowl 208 is connected to hold open rods 224. After moving composite fan cowl 208 using power door open system (PDOS) 222, composite fan cowl 208 is held open using hold open rods 224. Hold open rods 224 include hold open rod (HOR) 226 and hold open rod (HOR) 228.

After performing maintenance or another function on engine nacelle 202, composite fan cowl 208 may be rotated to a closed position using hinges 214. Latches 230 secure composite fan cowl 208 relative to the remainder of engine nacelle 202 when composite fan cowl 208 is in a closed position.

Latches 230 connect to composite fan cowl 208 in body zone 232. Body zone 232 is distal from hinge zone 218. Hinge zone 218 is above body zone 232 along arc 238 of core 210.

Body zone 232 has second thickness 234. Second thickness 234 is selected based on bending moment intensities of composite fan cowl 208. In some illustrative examples, first thickness 220 is less than second thickness 234. In some illustrative examples, first thickness 220 is at least 10% less than second thickness 234.

As depicted, core 210 has areas of increased thickness 236 associated with hold open rods 224. Areas of increased thickness 236 each comprise a ramp up, a pad, and a ramp down in a direction of arc 233 of the core 210. For example, area of increased thickness 240 includes ramp up 242, pad 244, and ramp down 246. Area of increased thickness 248 includes ramp up 250, pad 252, and ramp down 254. Areas of increased thickness 236 are positioned within body zone 232.

The two areas of increased thickness 236 of core 210 comprise a plurality of ramps. The plurality of ramps comprises a ramp up for each of the two areas of increased thickness 236 and a ramp down for each of the two areas of increased thickness 236. The ramp up for each of the two areas of increased thickness 236 progressively increases in thickness from second thickness 234 to third thickness 256. The ramp down for each of the two areas of increased thickness 236 progressively decreases in thickness from third thickness 256 to second thickness 234.

First thickness 220 is less than second thickness 234. In some illustrative examples, each of first thickness 220 and second thickness 234 are in the range of 0.5 inches to 1.5 inches. Third thickness 256 is greater than second thickness 234. In some illustrative examples, third thickness 256 is in the range of 1.5 inches to 2.5 inches.

By having third thickness 256 within only areas of increased thickness 236 and not all of body zone 232, the weight of core 210 may be reduced. By having third thickness 256 within areas of increased thickness 236, deformation of composite fan cowl 208 may be kept to an acceptable amount.

Hold open rod (HOR) 226 is associated with pad 244. Pad 244 has third thickness 256. Hold open rod (HOR) 228 is associated with pad 252. Pad 252 has third thickness 256. The two areas having third thickness 256, area of increased thickness 240 and area of increased thickness 248, provide local stiffening in an area of the highest strain under gust loading. The two areas having third thickness 256, area of increased thickness 240 and area of increased thickness 248, provide local stiffening in an area of highest bending moment on composite fan cowl 208.

The ramp up for each of the two areas of increased thickness 240, 248 and the ramp down for each of the two areas of increased thickness 240, 248 change in thickness along arc 233 of core 210. In some illustrative examples, the ramp up for each of the two areas of increased thickness 240, 248 and the ramp down for each of the two areas of increased thickness 240, 248 are each in the range of about 10 degrees to about 25 degrees.

Ramp up 242 increases in thickness from second thickness 234 to third thickness 256 in direction of arc 233. Ramp down 246 decreases in thickness from third thickness 256 to second thickness 234 in direction of arc 233.

Ramp up 250 increases in thickness from second thickness 234 to third thickness 258 in direction of arc 233. Ramp down 254 decreases in thickness from third thickness 258 to second thickness 234 in direction of arc 233.

Layout 212 includes transitions 260. Transitions 260 are areas between the zones or other portions of core 210 having different thicknesses. Transitions 260 includes ramp up 242, ramp down 246, ramp up 250, ramp down 254, and transition 262. Transition 262 is a portion of core 210 between hinge zone 218 and body zone 232. Transition 262 includes thicknesses from first thickness 220 to second thickness 234.

A thickness of areas of increased thickness 236 is selected based on a bending moment of composite fan cowl 208 when subjected to wind gusts when composite fan cowl 208 is in an open position. For example, third thickness 256 and third thickness 258 are selected based on a bending moment of composite fan cowl 208 when subjected to wind gusts when composite fan cowl 208 is in an open position.

Core 210 of composite fan cowl 208 has arcuate length 264 defined from hinge zone 218 to body zone 232. Each of hinge zone 218 and body zone 232 has a respective arcuate length. Hinge zone 218 has arcuate length 266 and body zone 232 has arcuate length 268. In some illustrative examples, a ratio of arcuate length 266 of hinge zone 218 to that of arcuate length 268 of body zone 232 is less than about 1:4.

In some illustrative examples, composite fan cowl 208 is symmetric about centerline 270 running in a direction of arc 238 of core 210. In these examples, core 210 is also symmetric about centerline 270 running in the direction of arc 238 of core 210.

The illustration of composite fan cowl 208 of aircraft 200 in FIG. 2 is not meant to imply physical or architectural limitations to the manner in which an illustrative embodiment may be implemented. Other components, in addition to or in place of the ones illustrated, may be used. Some components may be unnecessary. Also, the blocks are presented to illustrate some functional components. One or more of these blocks may be combined, divided, or combined and divided into different blocks when implemented in an illustrative embodiment.

For example, some illustrative examples may not include areas of increased thickness 236. Some illustrative examples may include second thickness 234 greater than first thickness 220 and sufficient to provide support to hold open rods 224.

In other illustrative examples, core 210 includes areas of increased thickness 236 and first thickness 220 is greater than second thickness 234. In these illustrative examples, first thickness 220 may be selected based on considerations other than the bending moments of composite fan cowl 208. In these illustrative examples, areas of increased thickness 236 provide support to hold open rods 224.

Figure 3:
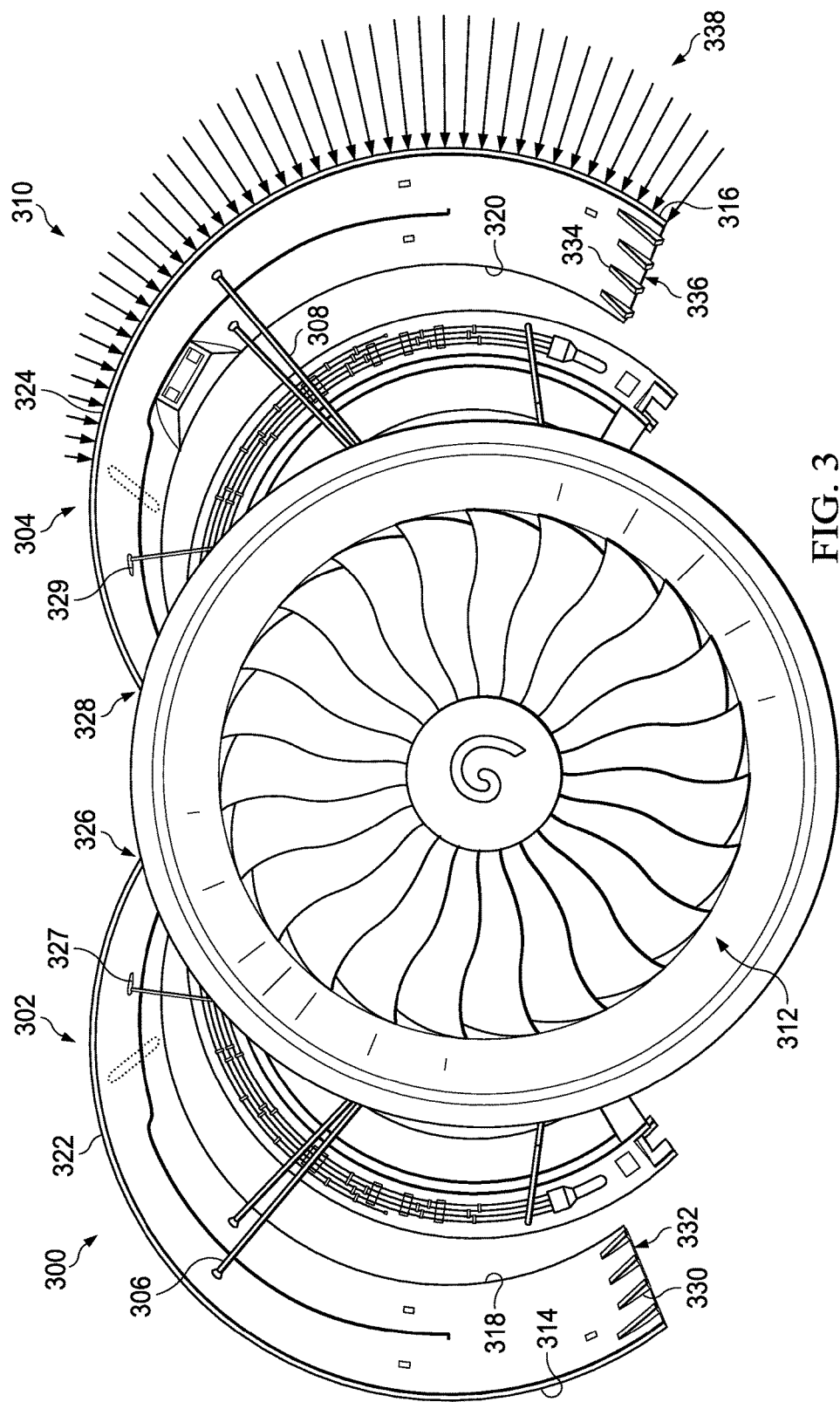
FIG. 3 is an illustration of an engine nacelle in an open position with a force diagram overlaid on a fan cowl in accordance with an illustrative embodiment.

Turning now to FIG. 3, an illustration of an engine nacelle in an open position with a force diagram overlaid on a fan cowl is depicted in accordance with an illustrative embodiment. Engine nacelle 300 may be a physical implementation of engine nacelle 202 of FIG. 2.

Engine nacelle 300 is depicted in an open position. Engine nacelle 300 has top portion 301 with hinges (not depicted). Engine nacelle 300 has composite fan cowl 302 and composite fan cowl 304. Composite fan cowl 302 is pivotally connected to top portion 301 by the hinges. Composite fan cowl 304 is pivotally connected to top portion 301 by the hinges. At least one of composite fan cowl 302 or composite fan cowl 304 may be a physical implementation of composite fan cowl 208 of FIG. 2.

Composite fan cowl 302 may comprise a core with a hinge zone having a first thickness and a body zone having a second thickness, wherein the hinge zone includes the hinges, wherein the body zone is distal from the hinge zone, and wherein the first thickness is less than the second thickness. Composite fan cowl 304 may comprise a core with a hinge zone having a first thickness and a body zone having a second thickness, wherein the hinge zone includes the hinges, wherein the body zone is distal from the hinge zone, and wherein the first thickness is less than the second thickness.

Both composite fan cowl 302 and composite fan cowl 304 are held in an open position. Composite fan cowl 302 is held open by hold open rods (HOR) 306. Composite fan cowl 304 is held open by hold open rods (HOR) 308.

View 310 of engine nacelle 300 is a front view of engine nacelle 300. Inlet 312 of engine nacelle 300 is visible in view 310. Air will flow into the page, entering engine nacelle 300 at inlet 312 and exiting engine nacelle 300 at an exhaust (not depicted).

Composite fan cowl 302 has leading edge 314 that is positioned near inlet 312. Composite fan cowl 304 has leading edge 316 that is positioned near inlet 312. Composite fan cowl 302 has trailing edge 318 positioned near the exhaust (not depicted) of engine nacelle 300. Composite fan cowl 304 has trailing edge 320 positioned near the exhaust (not depicted) of engine nacelle 300.

Composite fan cowl 302 has arc 322. Composite fan cowl 304 has arc 324. Composite fan cowl 302 swings up using hinges at first end 326 of arc 322. Movement of composite fan cowl 302 may be powered by power door open system (PDOS) 327. Composite fan cowl 304 swings up using hinges at first end 328 of arc 324. Movement of composite fan cowl 304 may be powered by power door open system (PDOS) 329.

After closing composite fan cowl 302, composite fan cowl 302 is secured using latches 330 at second end 332 of arc 322. After closing composite fan cowl 304, composite fan cowl 304 is secured using latches 334 at second end 336 of arc 324. First end 326 and second end 332 are opposing ends of arc 322. First end 328 and second end 336 are opposing ends of arc 324.

View 310 of engine nacelle 300 includes exemplary forces 338. Exemplary forces 338 depict a force distribution on composite fan cowl 304 due to a gust of wind. More specifically, exemplary forces 338 is a force distribution on composite fan cowl 304 for a gust of wind near hold open rods (HOR) 308.

Figure 4:
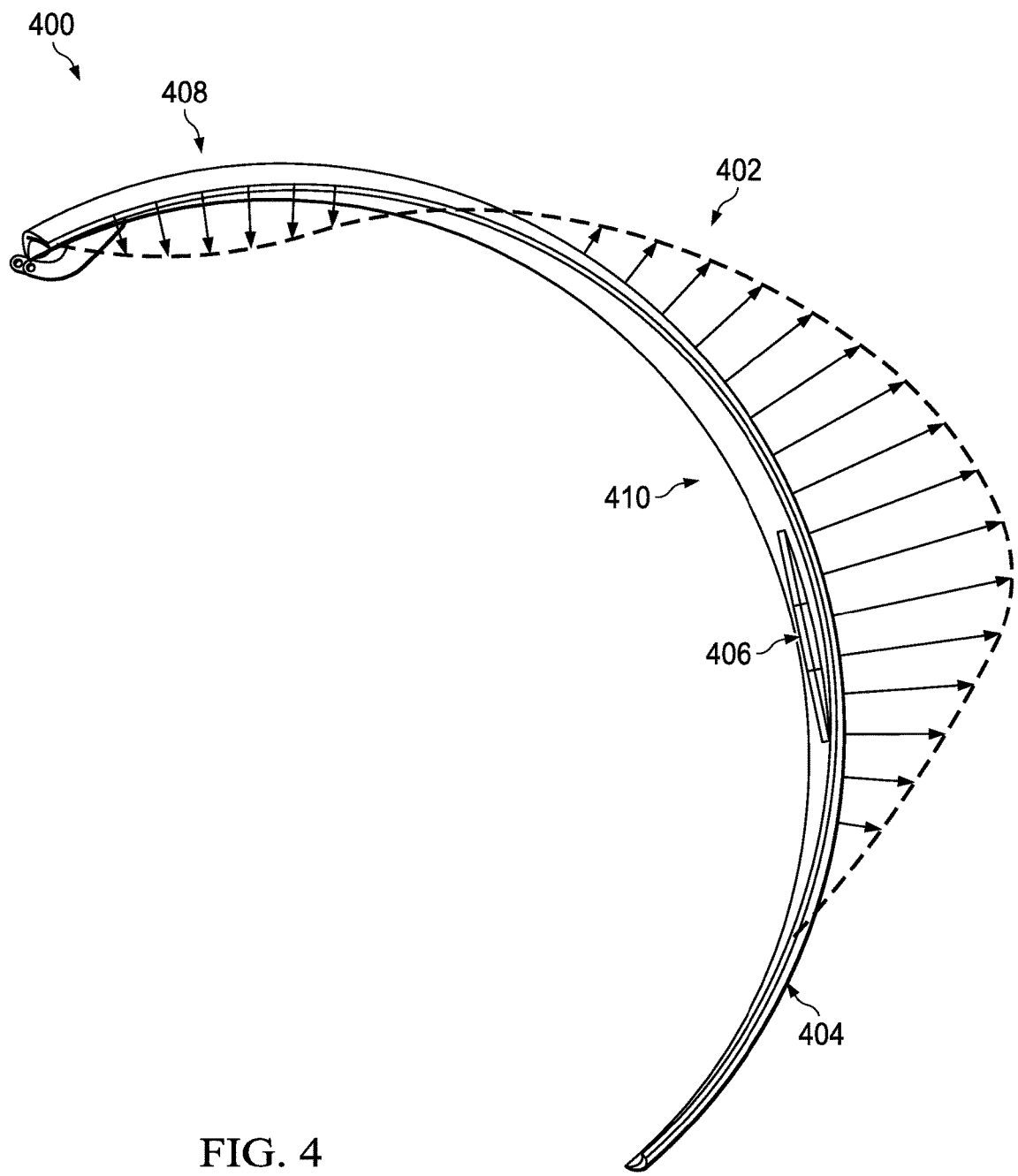
FIG. 4 is an illustration of bending moment intensities of a composite fan cowl in accordance with an illustrative embodiment.

Turning now to FIG. 4, an illustration of bending moment intensities of a composite fan cowl is depicted in accordance with an illustrative embodiment. View 400 may be a view of bending moment intensities 402 on composite fan cowl 404. Composite fan cowl 404 is a physical implementation of composite fan cowl 208 of FIG. 2.

Composite fan cowl 404 may be a conventional composite fan cowl. Bending moment intensities 402 on composite fan cowl 404 may be the resulting deflections of exemplary forces 338 of FIG. 3 applied to composite fan cowl 404. As depicted in view 400, bending moment intensities 402 peak at hold open rod fittings 406. Further, bending moment intensities 402 includes small intensities near hinge zone 408 of composite fan cowl 404.

To tailor a core of a composite fan cowl, such as composite fan cowl 208, bending moment intensities 402 are taken into account. For example, a core thickness may be lower in areas with lower bending moment intensities. In one example, a core thickness is lower in hinge zone 408 than in body zone 410. Areas of increased thickness may be applied at hold open rod fittings 406 to reduce deformation at the peak of bending moment intensities 402.

Figure 5:
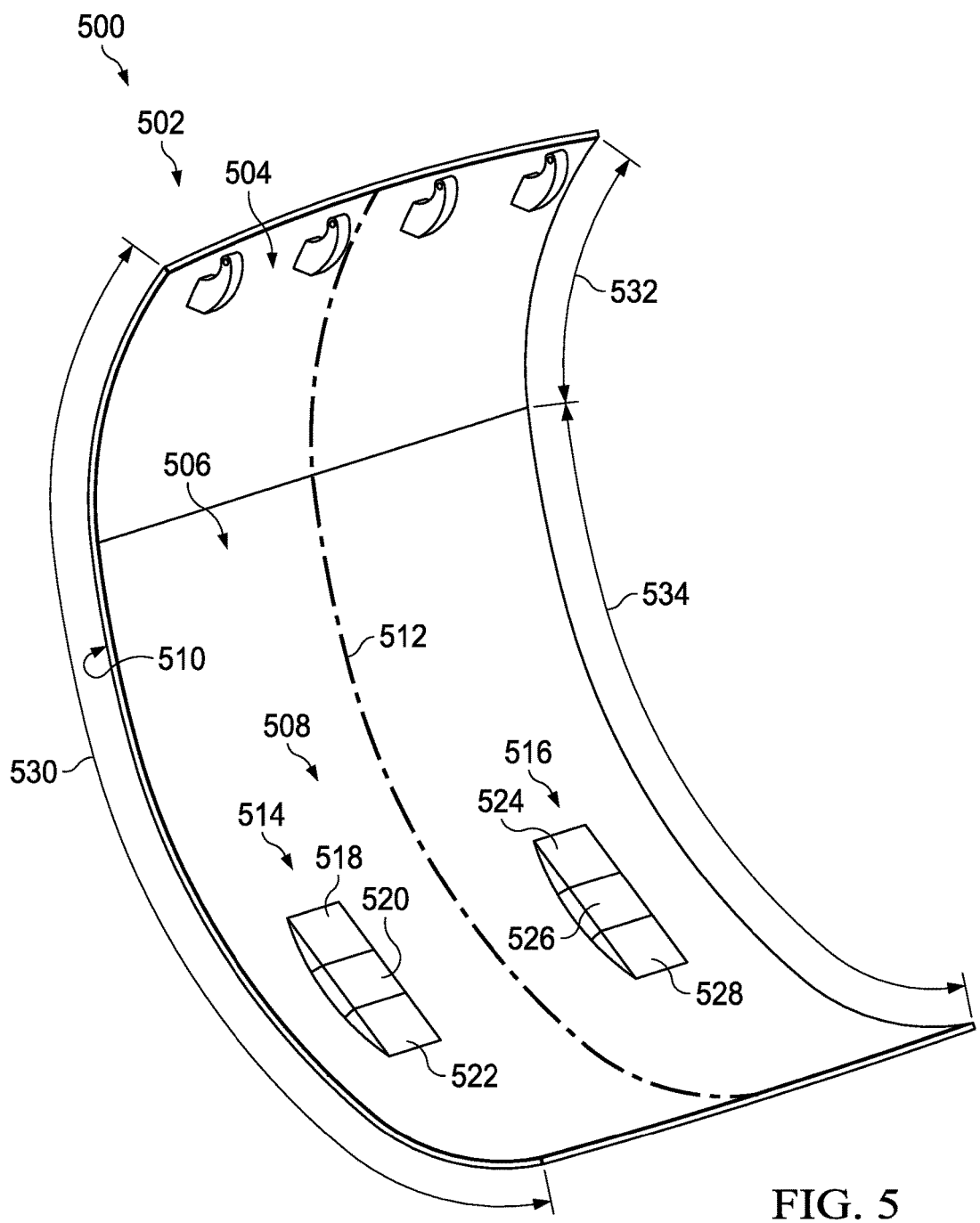
FIG. 5 is an illustration of a first layout for a core of a composite fan cowl in accordance with an illustrative embodiment.

Turning now to FIG. 5, an illustration of a first layout for a core of a composite fan cowl is depicted in accordance with an illustrative embodiment. Layout 500 may be a physical implementation of layout 212 of FIG. 2. Layout 500 of core 502 may be a three-dimensional model of a core for a composite fan cowl, such as core 210 of composite fan cowl 208 of FIG. 2. Layout 500 may be a three-dimensional model of a core for a composite fan cowl, such as a core for composite fan cowl 302 or composite fan cowl 304 of FIG. 3. Layout 500 may be based on bending moment intensities 402 of FIG. 4 and exemplary forces 338 of FIG. 3.

Layout 500 of core 502 includes hinge zone 504, body zone 506, and areas of increased thickness 508. Body zone 506 is distal to hinge zone 504. Hinge zone 504 is above body zone 506 along arc 510 of core 502. As depicted, core 502 is symmetric about centerline 512 running in a direction of arc 510 of core 502.

Hinge zone 504 has a first thickness (not depicted). Body zone 506 has a second thickness (not depicted). Areas of increased thickness 508 includes two areas having a third thickness (not depicted). Areas of increased thickness 508 are positioned within body zone 506. Areas of increased thickness 508 provide local stiffening in an area of the highest strain under gust loading. Areas of increased thickness 508 provide local stiffening in an area of the highest strain under gust loading. Areas of increased thickness 508 having the third thickness provide local stiffening in an area of highest bending moment on the composite fan cowl.

In this illustrative example, the first thickness and second thickness are different from each other. In this illustrative example, areas of increased thickness 508 have a greater thickness than the second thickness, and the first thickness and second thickness are in the range of 0.5 inches and 1.5 inches. Each of the first thickness and the second thickness may be selected based on at least one of bending moment intensities 402 of FIG. 4, exemplary forces 338 of FIG. 3, or structural or performance requirements for the composite fan cowl. In one non-limiting example, the first thickness is about 0.7 inch while the second thickness is about 1.0 inch. In some illustrative examples, the first thickness is at least 10% less than the second thickness.

Areas of increased thickness 508 include area of increased thickness 514 and area of increased thickness 516. Area of increased thickness 514 includes ramp up 518, pad 520, and ramp down 522. Area of increased thickness 516 includes ramp up 524, pad 526, and ramp down 528. Area of increased thickness 514 and area of increased thickness 516 may also be referred to as local tapered pads. Area of increased thickness 514 and area of increased thickness 516 are positioned at hold open rod (HOR) fittings to decrease deflections.

Pad 520 and pad 526 have the third thickness. The third thickness is in the range of 1.5 inches to 2.5 inches. In one non-limiting example, the third thickness is about 2 inches. Ramp up 518, ramp down 522, ramp up 524, and ramp down 528 change in thickness along arc 510 of core 502. Ramp up 518 and ramp up 524 change from the second thickness to the third thickness moving from body zone 506 to pad 520 and pad 526, respectively. Ramp down 522 and ramp down 528 change from the third thickness to the second thickness moving from pad 520 and pad 526 to body zone 506.

Core 502 has arcuate length 530 defined from hinge zone 504 to body zone 506. Each of hinge zone 504 and body zone 506 have a respective arcuate length. Hinge zone 504 has arcuate length 532. Body zone 506 has arcuate length 534. A ratio of arcuate length 532 of hinge zone 504 to that of arcuate length 534 of body zone 506 is less than about 1:4.

Figure 6:
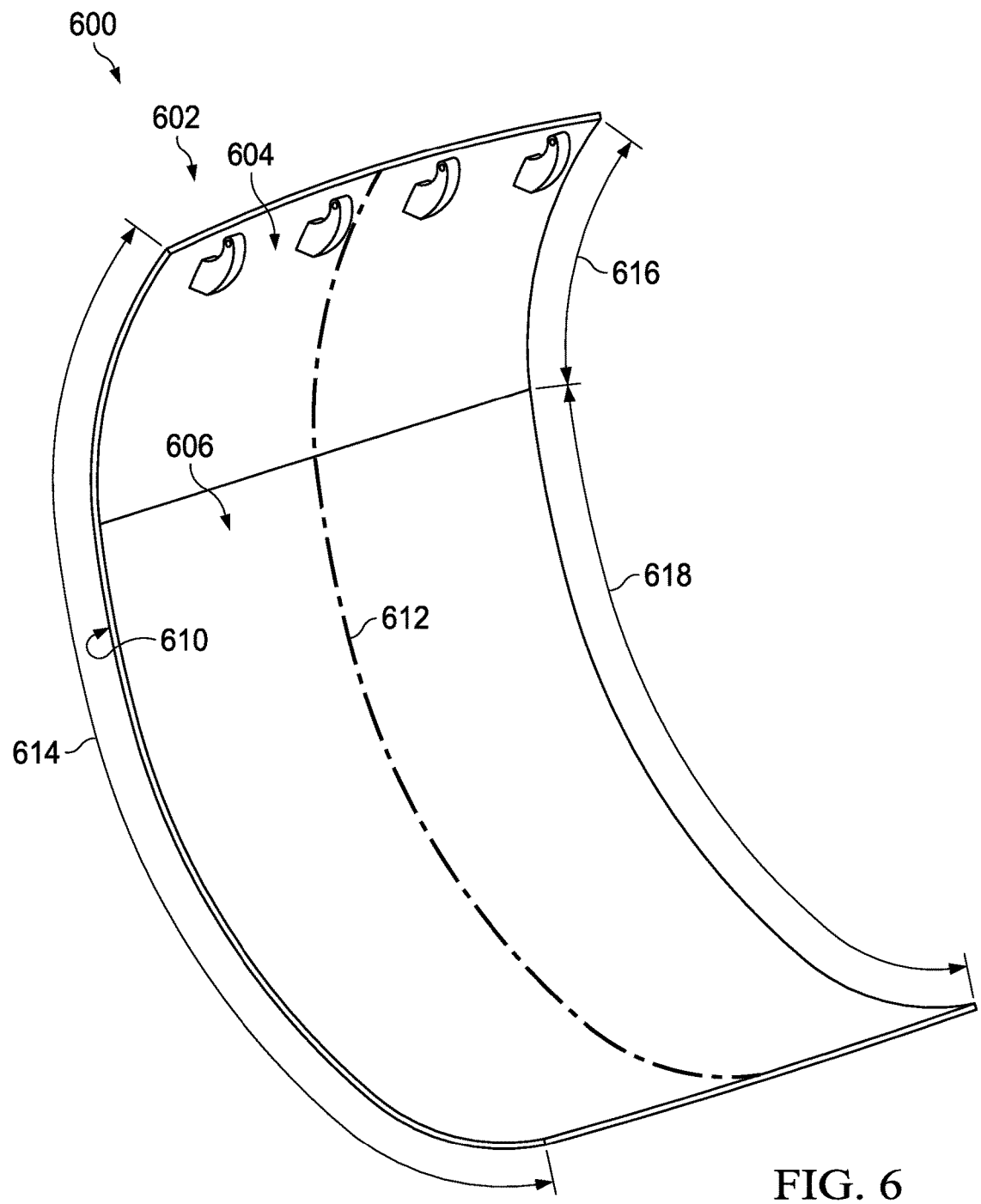
FIG. 6 is an illustration of a second layout for a core of a composite fan cowl in accordance with an illustrative embodiment.

Turning now to FIG. 6, an illustration of a second layout for a core of a composite fan cowl is depicted in accordance with an illustrative embodiment. Layout 600 may be a physical implementation of layout 212 of FIG. 2 without areas of increased thickness 236. Layout 600 of core 602 may be a three-dimensional model of a core for a composite fan cowl, such as core 210 of composite fan cowl 208 of FIG. 2. Layout 600 may be a three-dimensional model of a core for a composite fan cowl, such as a core for composite fan cowl 302 or composite fan cowl 304 of FIG. 3. Layout 600 may be based on bending moment intensities 402 of FIG. 4 and exemplary forces 338 of FIG. 3.

Layout 600 of core 602 includes hinge zone 604 and body zone 606. Body zone 606 is distal to hinge zone 604. Hinge zone 604 is above body zone 606 along arc 610 of core 602. As depicted, core 602 is symmetric about centerline 612 running in a direction of arc 610 of core 602.

Hinge zone 604 has a first thickness (not depicted). Body zone 606 has a second thickness (not depicted).

In this illustrative example, the first thickness and the second thickness are different from each other. In this illustrative example, the first thickness and the second thickness are in the range of 0.5 inches and 1.5 inches. Each of first thickness and the second thickness may be selected based on at least one of bending moment intensities 402 of FIG. 4, exemplary forces 338 of FIG. 3, or structural or performance requirements for the composite fan cowl. In one non-limiting example, the first thickness is about 0.7 inch while the second thickness is about 1.0 inch. In some illustrative examples, the first thickness is at least 10% less than the second thickness.

Core 602 has arcuate length 614 defined from hinge zone 604 to body zone 606. Each of hinge zone 604 and body zone 606 have a respective arcuate length. Hinge zone 604 has arcuate length 616. Body zone 606 has arcuate length 618. A ratio of arcuate length 616 of hinge zone 604 to that of arcuate length 618 of body zone 606 is less than about 1:4.

The different components shown in FIGS. 1 and 3-6 may be combined with components in FIG. 2, used with components in FIG. 2, or a combination of the two. Additionally, some of the components in FIGS. 1 and 3-6 may be illustrative examples of how components shown in block form in FIG. 2 can be implemented as physical structures.

Figure 7:
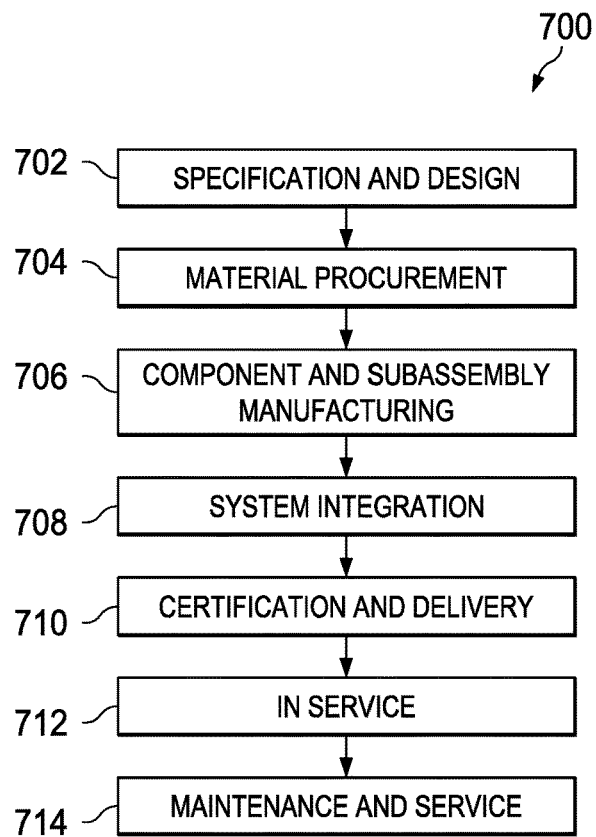
FIG. 7 is an illustration of an aircraft manufacturing and service method in the form of a block diagram in accordance with an illustrative embodiment.
Figure 8:
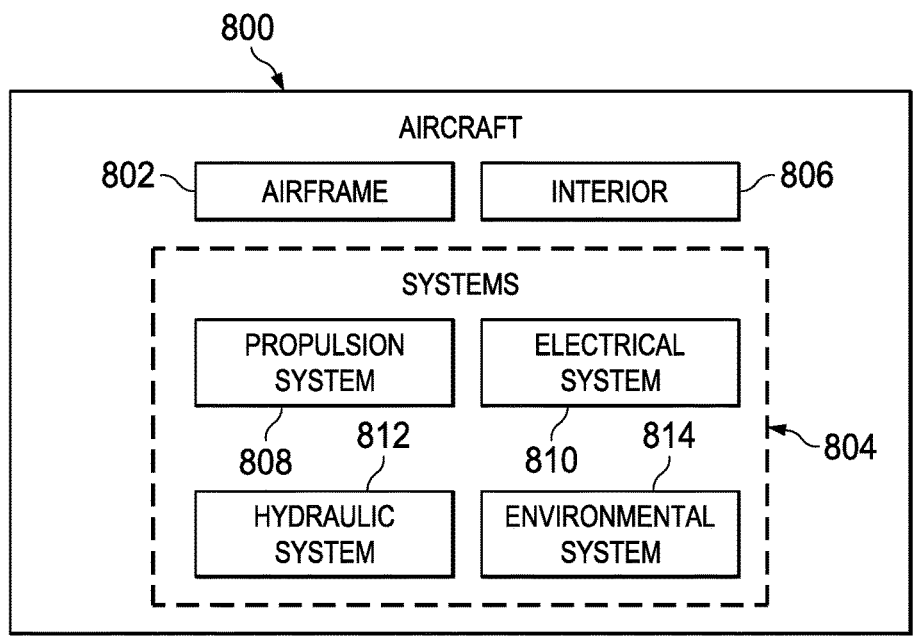
FIG. 8 is an illustration of an aircraft in the form of a block diagram in which an illustrative embodiment may be implemented.

Illustrative embodiments of the present disclosure may be described in the context of aircraft manufacturing and service method 700 as shown in FIG. 7 and aircraft 800 as shown in FIG. 8. Turning first to FIG. 7, an illustration of an aircraft manufacturing and service method is depicted in accordance with an illustrative embodiment. During pre-production, aircraft manufacturing and service method 700 may include specification and design 702 of aircraft 800 in FIG. 8 and material procurement 704.

During production, component and subassembly manufacturing 706 and system integration 708 of aircraft 800 takes place. Thereafter, aircraft 800 may go through certification and delivery 710 in order to be placed in service 712. While in service 712 by a customer, aircraft 800 is scheduled for routine maintenance and service 714, which may include modification, reconfiguration, refurbishment, or other maintenance or service.

Each of the processes of aircraft manufacturing and service method 700 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 8, an illustration of an aircraft is depicted in which an illustrative embodiment may be implemented. In this example, aircraft 800 is produced by aircraft manufacturing and service method 700 in FIG. 7 and may include airframe 802 with plurality of systems 804 and interior 806. Examples of systems 804 include one or more of propulsion system 808, electrical system 810, hydraulic system 812, and environmental system 814. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 700. One or more illustrative embodiments may be used in aircraft 800. One or more illustrative embodiments may be formed during component and subassembly manufacturing 706 of FIG. 7. For example, core 210 of composite fan cowl 208 of FIG. 2 may be formed during component and subassembly manufacturing 706. Further, core 210 of composite fan cowl 208 of FIG. 2 may be rotated open during maintenance and service 714 of FIG. 7. During maintenance and service 714 of FIG. 7, core 210 of composite fan cowl 208 may undergo deformation from a gust of wind.

The illustrative examples show a composite fan cowl with a core having a tailored thickness. Fan cowls may experience large deflections during ground gusts when the airplane is parked and the fan cowls are in the open position. Large deflections are undesirable, since the fan cowl could come into contact with the thrust reverser actuation system (TRAS) or other portions of the engine nacelle.

A conventional solution to deformation is to increase the core height of the entire composite bond panel. This is a weight prohibitive solution.

The illustrative examples present a new core height concept to minimize weight and reduce gust deflections. The illustrative examples recognize and take into account that deformation may be reduced by selectively tailoring the core thickness. Local stiffening in the area of the highest strain under gust loading allows for a weight-efficient design.

In order to implement this core having a tailored thickness, the load distribution and panel's non-linear large deflection response are determined first. The panel presented in the illustrative examples is stiffened near the area of the highest bending moment of the panel.

There is a benefit from saving weight in an efficient manner. For instance, weight savings may be compared to a change in deformation of the composite fan cowl. The measurement may be described as pounds saved over increase of deformation in inches.

In some illustrative examples, the core with tailored thickness would decrease the entire panel to heights in the range of 0.7 inches to 1 inch, with local tapered pads at the hold open rod (HOR) fittings to decrease deflections. In other illustrative examples, the core with a tailored thickness would decrease the entire core's heights without providing pads.

By only decreasing core height to within a range of 0.7 inches to 1.0 inch, an amount of weight may be reduced. For example, decreasing the core height only may reduce the weight by about forty pounds. Decreasing the core height also increases the deformation of the fan cowl. Only decreasing the core height may not result in saving weight in a most efficient manner. For example, other approaches may result in a greater measurement of pounds saved per inch increase of deformation. Decreasing the core height may result in approximately 15 pounds saved per inch increase of deformation.

By decreasing core height to within a range of 0.7 inches to 1.0 inch and including local tapered pads at the hold open rod (HOR) fittings, the weight is decreased from a conventional fan cowl. For example, decreasing the core height with local tapered pads reduces the weight by about 34 pounds. Including local tapered pads with the decreased core height results in a more efficient weight savings, than only decreasing the core height. For example, a reduced core height to within 0.7 inches to 1.0 inch, including local tapered pads, may have about 24 pounds saved per inch increase of deformation. Further, the total deformation of the fan cowl having local tapered pads is less than the deformation of a fan cowl having the same core heights without the local tapered pads. For example, adding pads at the hold open rod fittings produces 1.4 inches of additional deflection versus the baseline.

This concept is a design of a fan cowl structure that resists gust loads in a weight efficient way. By tailoring the core height of the composite bond panels, over 30 pounds can be removed from each panel. This concept could create a competitive advantage over a similar product by reducing the weight of the engine nacelle. The load distribution and panel's non-linear large deflection response are taken into account in order to implement this solution.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A composite fan cowl connected to hold open rods, the composite fan cowl comprising:
   laminate skins; and
   a core, comprising:
      a hinge zone having a first thickness;
      a body zone having a second thickness different than the first thickness, the body zone different than the hinge zone; and
      areas of increased thickness having a third thickness, the third thickness greater than the second thickness, the areas of increased thickness disposed in the body zone of the core, and the areas of increased thickness associated with hold open rods.

2. The composite fan cowl of claim 1, wherein the areas of increased thickness each comprise a ramp up, a pad, and a ramp down in a direction of an arc of the core.

3. The composite fan cowl of claim 2, wherein the core is symmetric about a centerline running in the direction of the arc of the core.

4. The composite fan cowl of claim 2, wherein a thickness of the pad is in a range of 1.5 inches to 2.5 inches.

5. The composite fan cowl of claim 1, wherein each respective thickness of the hinge zone and the body zone is in a range of 0.5 inches to 1 inch.

6. The composite fan cowl of claim 1, wherein the first thickness is less than the second thickness.

7. The composite fan cowl of claim 6, wherein the core has an arcuate length defined from the hinge zone to the body zone, with each of the hinge zone and the body zone having a respective arcuate length, and wherein a ratio of the arcuate length of the hinge zone to that of the body zone is less than about 1:4.

8. The composite fan cowl of claim 1, wherein a thickness of each of the laminate skins is independent of thicknesses of the core.

9. The composite fan cowl of claim 1, wherein a thickness of the areas of increased thickness is selected based on a bending moment of the composite fan cowl when subjected to wind gusts when the composite fan cowl is in an open position.

10. A composite fan cowl comprising:
    a hinge zone;
    a body zone; and
    a core, wherein:
       a first portion of the core is disposed within the hinge zone;
       a second portion of the core is disposed within the body zone;
       the first portion of the core has a first thickness;
       the second portion of the core has a second thickness;
       the core has two areas of increased thickness, each having a third thickness;
       the two areas of increased thickness are positioned within the second portion of the core;
       the first thickness is different than the second thickness; and
       the third thickness is greater than the second thickness.

11. The composite fan cowl of claim 10, wherein the two areas of increased thickness of the core comprise a plurality of ramps.

12. The composite fan cowl of claim 11, wherein the plurality of ramps comprise a ramp up for each of the two areas of increased thickness and a ramp down for each of the two areas of increased thickness, wherein the ramp up for each of the two areas of increased thickness progressively increases thickness from the second thickness to the third thickness, and wherein the ramp down for each of the two areas of increased thickness progressively decreases thickness from the third thickness to the second thickness.

13. The composite fan cowl of claim 12, wherein the ramp up for each of the two areas of increased thickness and the ramp down for each of the two areas of increased thickness have a change in thickness along an arc of the core, and wherein the ramp up for each of the two areas of increased thickness and the ramp down for each of the two areas of increased thickness are each in a range of about 10 degrees to about 25 degrees.

14. The composite fan cowl of claim 10, wherein the second thickness is greater than the first thickness, and wherein the hinge zone is above the body zone along an arc of the core.

15. The composite fan cowl of claim 10, wherein:
    the first thickness and the second thickness are in a first range of 0.5 inches to 1.5 inches; and
    the third thickness is in a second range of 1.5 inches to 2.5 inches.

16. The composite fan cowl of claim 10, wherein the two areas of increased thickness provide local stiffening in an area of highest strain under gust loading.

17. The composite fan cowl of claim 10, wherein the two areas of increased thickness provide local stiffening in an area of highest bending moment on the composite fan cowl.

18. An engine nacelle comprising:
    a top portion with hinges; and
    a composite fan cowl pivotally connected to the top portion by the hinges, the composite fan cowl comprising a core, wherein the core includes:
       a hinge zone having a first thickness of the core; and
       a body zone having a second thickness of the core, the hinge zone including the hinges, the body zone distally disposed from the hinge zone, and wherein the first thickness of the core less than the second thickness of the core.

19. The engine nacelle of claim 18, wherein the first thickness of the core is at least 10% less than the second thickness of the core, wherein two areas having a third thickness of the core are positioned within the body zone, and wherein the third thickness of the core is greater than the second thickness of the core.

20. A composite fan cowl comprising:
a core with a hinge zone having a first thickness, a body zone having a second thickness, and two areas of increased thickness including a third thickness;
wherein:
the two areas of increased thickness of the core comprise a plurality of ramps;
the two areas of increased thickness are positioned within the body zone;
the first thickness and second thickness are different from each other;
the two areas of increased thickness have a greater thickness than the second thickness;
the first thickness and the second thickness are in a range of 0.5 inches and 1.5 inches; and
the plurality of ramps comprise a ramp up for each of the two areas of increased thickness and a ramp down for each of the two areas of increased thickness, the ramp up for each of the two areas of increased thickness having progressively increased thickness from the second thickness to the third thickness, and the ramp down for each of the two areas of increased thickness having progressively decreased thickness from the third thickness to the second thickness.

21. The composite fan cowl of claim 20, wherein the plurality of ramps:
have a change in thickness along an arc of the core; and
are each in a range of about 10 degrees to about 25 degrees.

* * * * *